United States Patent Office 3,419,243
Patented Dec. 31, 1968

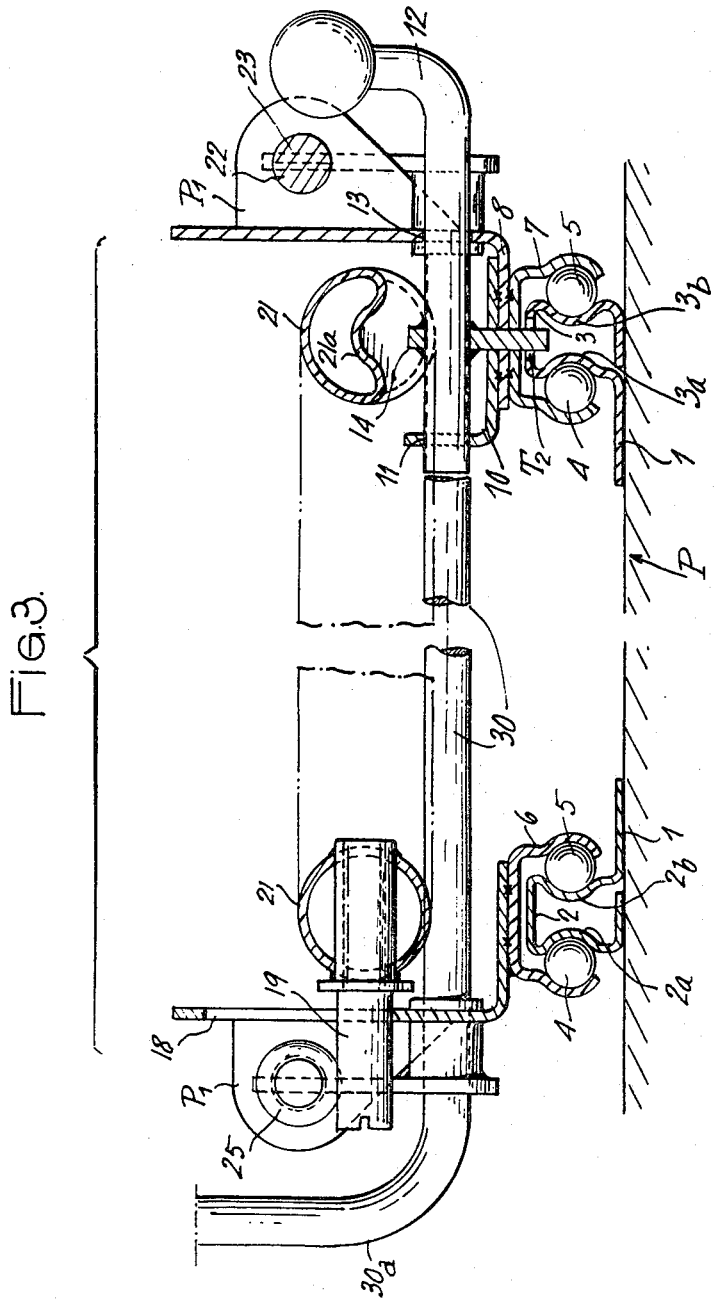

3,419,243
SYSTEM FOR SETTING THE HEIGHT OF SEATS
IN AUTOMOTIVE VEHICLES
Joseph Gabriel Berthier, Levallois-Perret, France, assignor to Tubauto, Levallois-Perret, France, a French company
Filed Nov. 21, 1966, Ser. No. 595,823
Claims priority, application France, Dec. 17, 1965, 42,767
6 Claims. (Cl. 248—394)

ABSTRACT OF THE DISCLOSURE

An economical and easily-fabricated automotive vehicle seat adjustable both longitudinally and in slope. A seat frame includes a plurality of laterally-extending stub shafts which engage vertically-extending slots in two side plates and spring-biased plungers lock each stub shaft in place in a respective slot. A crank which reciprocates the plungers allows the stub shafts to be raised or lowered in the slots to determine the height and the slope of the seat. The side plates are longitudinally adjustable along floor-mounted rails to adjust the longitudinal position of the seat.

---

This invention relates to a system for adjusting the height of an automotive vehicle seat. The invention also allows the seat to be pitched rearwardly or forwardly.

In accordance with the invention, the seat frame is mounted on an intermediate member, which extends on both sides of the seat, by means of a plurality of stub shafts which are rigidly attached to the frame and which fit into upwardly extending slots provided in the intermediate member. The intermediate member includes one or more devices for locking the stub shafts in selected ones of several positions in the slots in order to determine the height and the slope of the seat, and the intermediate member is in turn slidably mounted to allow the seat to be adjusted forwardly or rearwardly relative to the floor of the vehicle.

The slidably mounted intermediate member includes a pair of vertical flanges, one at each side of the seat, with the mentioned pair of vertically-extending slots provided in each flange to accommodate the stub shafts of the seat frame. A plurality of brackets on each flange support a longitudinally-extending spring-biased shaft on each flange, and each spring-biased shaft acts to clamp a stub shaft of the seat in a selected position within a respective vertically-extending slot. Operation of a pivotally-mounted lever or crank unlocks the front pair or the rear pair of stub shafts and hence allows either the front or the back of the seat to be raised or lowered.

Other objects and advantages of the present invention will become apparent upon reading the following detailed description.

An embodiment, according to the object of the present invention, is given, solely as an example, in the accompanying drawings in which:

FIGURE 3 is a partially fragmentary front elevation following line III—III of FIGURE 2.

Figure 1:
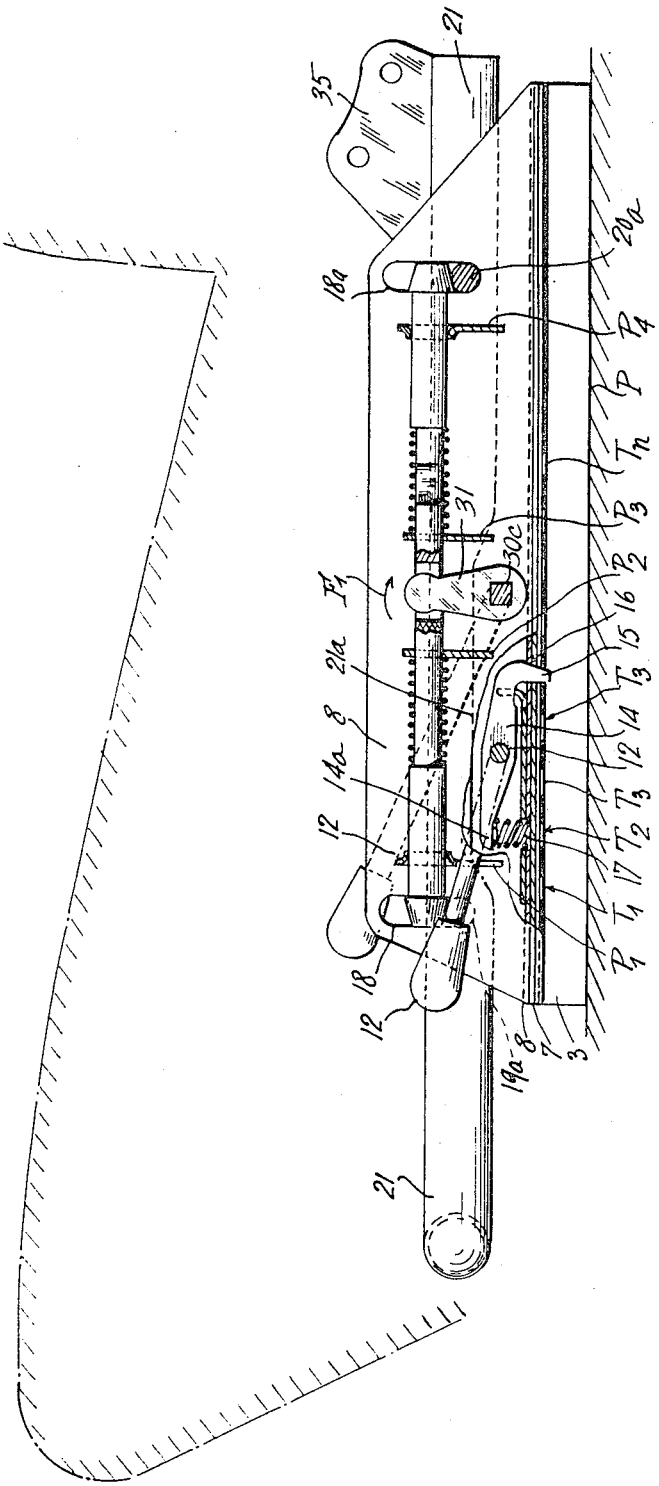
FIGURE 1 is a side view of the system designed for the selective setting of the seat of an automotive vehicle.
Figure 2:
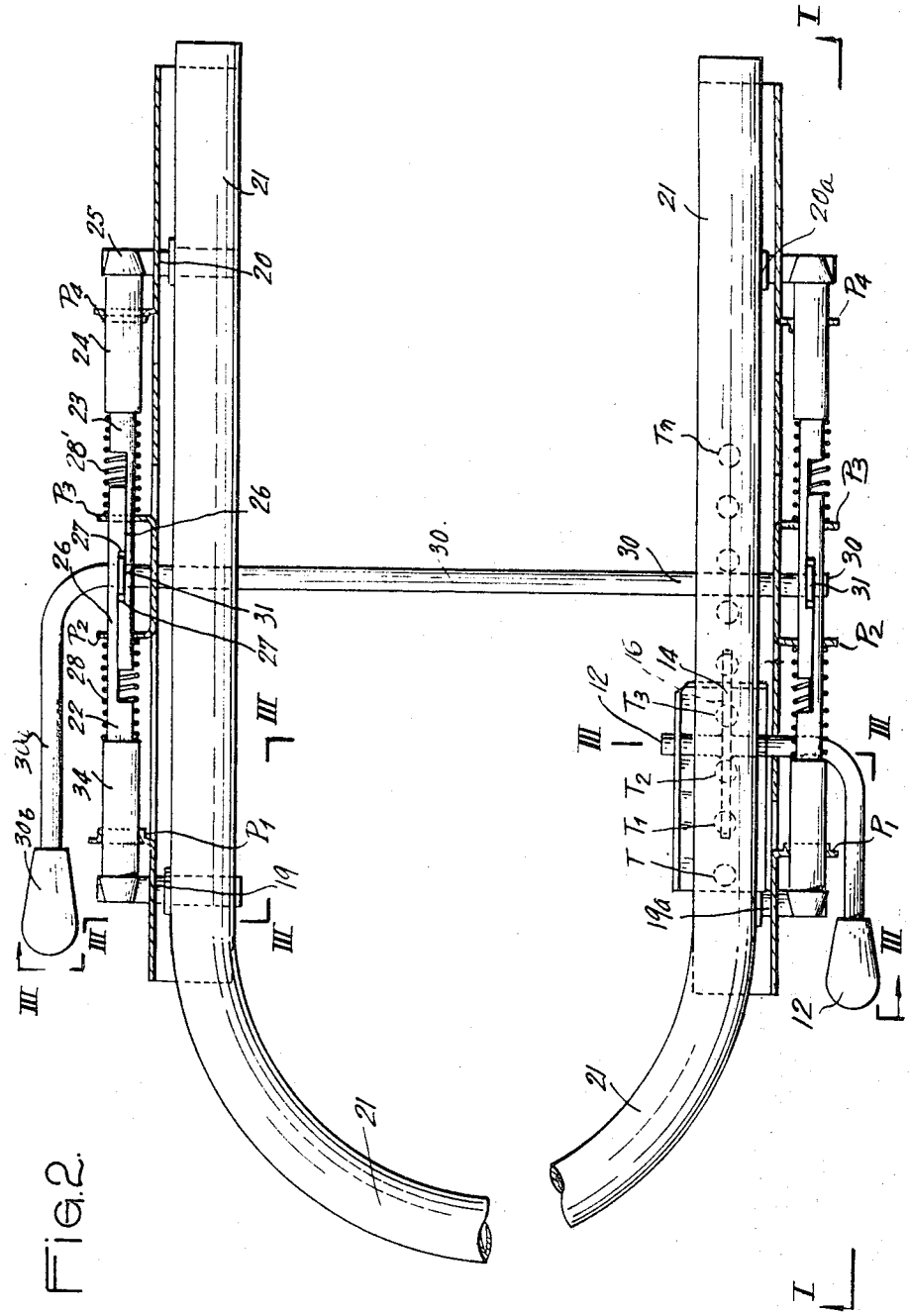
FIGURE 2 is a plan view of the system illustrated in FIGURE 1.

On the floor P of a vehicle are fixed by any suitable means, plate means 1, 1 shaped to form two rails 2, 3 having semi-circular recesses 2a, 2b, 2c, 2d along their sides, with a plurality of steel balls 4, 5 located in the recesses and held therein by mating slide pieces 6, 7. Each slide member 6 or 7 carries a generally L-shaped structural angle intermediate member 8. On the lefthand side of a righthand seat, and on the righthand side of a lefthand seat, and shown in FIG. 3 at the bottom of angle member 8 is fixed a small angle piece 10 having a hole provided through its vertical flange. A crank or lever 12 passes through aperture 13 provided in intermediate member 8 and carries near its mid-portion a finger catch 14 designed to mate with or engage a selected one of a set of holes T, $T_1$, $T_2$ . . . $T_n$ located along the upper side of rail 3. The end of lever or crank 12 passes through aperture 16 (FIG. 1) formed in the stacked flanges of angles 8 and 10 and of slide 7 so that end 15 of catch 14 can engage a selected hole in rail 3. The rear portion 14a of finger or catch 14 is biased by spring 17 supported on the upper side of slide member 7, thereby holding end 15 of catch 14 in the selected hole in rail 3. It will be apparent from the structure shown, that upon depressing the upper end of crank 12 one can move slides 6 and 7 backward or forward along rails 2 and 3 and then selectively lock slides 6 and 7 in a desired position by allowing end 15 of finger catch 14 to drop into the appropriate hole T. Thus the forward and rearward adjustment of the seat is readily accomplished.

Angle-shape intermediate members 8 each include a plurality of shaft-supporting bearings $P_1$, $P_2$, $P_3$, $P_4$ which preferably are formed by bending back tabs which have been partially cut out from the vertical flanges of members 8. Two vertically-extending slots 18, 18a are provided in each of the vertical flanges of angles 8, near the front and rear ends of each of the members, to receive two stub shafts shown at 19, 20 on the righthand side of the seat and shown at 19a and 20a on the lefthand side of the seat. The stub shafts are rigidly affixed to and form integral parts of a U-shaped length of tubing 21 which comprises the lower part of the seat frame. It may be noted that tubing 21 is flattened at 21a (FIG. 3) in the area where it passes over finger catch 14.

Two slide shafts 22, 23 are shown provided on each side of the seat. The front end of slide shaft 22 includes a cylindrical socket portion 34 shown terminating in an enlarged portion having the shape of a truncated cone. The rear end 26 of front slide shaft 22 and the front end of rear slide shaft 23 are each flattened to form a recess or slot 27. Numeral 28 indicates a spring which is positioned to act between socket 34 and bearing support $P_2$, thereby to urge socket 34 forwardly. Similarly parts are used for rear shaft 23, and spring 28' is shown acting between socket 24 and bearing flange $P_4$.

Crank 30a includes a shaft portion 30 which passes through apertures in the vertical flanges of intermediate members 8, and terminates with a handle portion 30a and an operating knob 30b. A pair of levers 31, 31 mounted on square sections 30c of shaft 30 pass through the slots 27 at the ends of the slide shafts 22, 23 on each side of the seat. If levers 31 are pivoted as indicated by arrow $F_1$ (FIG. 1), front slide shafts 22, 22 will be pulled rearwardly, thereby unlocking front stub shafts 19, 19a. One then can lift the front edge of the seat in order to raise stub shafts 19, 19a up to the upper part of vertically-extending slots 18. Upon release of the crank, springs 28, 28 push slide shafts 22, 22 back under stub shafts 19, 19a. Then the front part of the seat will be held in a lifted position. Should one move the crank in an opposite direction, it will be seen that rear slide shafts will slide forward and unlock rear stub shafts 20 and 20a. One then can lift these up to the top of vertically-extending rear slots 18a, and then, upon release of the crank, the rear slide shafts will return to their locking position under the force of springs 28', and the rear part of the seat will have been lifted. Thus one can change the position of the seat by raising or lowering it or by sloping it in either direction, since stub shafts 19, 19a can be located either at the top or bottom of slots 18, and similarly, stub shafts 20, 20a can be located either at the top or at the bottom of slots 18a.

The rear ends of tubing 21, which form part of the seating structure, are fitted with flanges 35, (FIG. 1) on which are directly mounted the ends of the framework of the seat's back, or a seat back's tilting hinge which is how integral part of the seat back's framework.

In some cases, crank 30a, 30b can be located on the same side of the seat as lever 12 which controls the forward or rearward setting of the seat, or, on the contrary, crank 30 can be located on the side opposite from where crank 12 is positioned, as is illustrated in the drawings. These locations will depend on the space allowed for by the manufacturers for placing the seats.

Various other changes can be applied to the specific embodiment described herein, but it is understood that this is by way of illustration only, and not, by any way of limitation and the scope of the invention.

I claim:

1. An automotive vehicle seat assembly which is adjustable both longitudinally and in slope, comprising, in combination: first means for slidably mounting said seat on the floor of a vehicle, said first means including rail means fixedly attached to the floor of said vehicle and a pair of slide members adapted to be slid adjustably along said rail means to a desired position, each of said slide members having a vertically-extending plate portion having at least one slot; a seat frame having a plurality of stub shafts laterally extending from said seat frame and engaging said slots in said plate portions; at least one longitudinally-extending reciprocable slide bar slidably on one of said plate portions; spring means for urging said slide bar to a longitudinal position wherein a portion of said slide bar engages one of said stub shafts, thereby fixing said one of said stub shafts at a first position within said slot in said plate portion; and control means for reciprocating said slide bar against the force of said spring means to disengage said slide bar from said one of said stub shafts and allow said one of said stub shafts to be moved to a different position within said slot.

2. An assembly according to claim 1 in which said control means comprises a crank journalled in at least one of said plate portions and a lever connected between said crank and said slide bar to reciprocate said slide bar.

3. An assembly according to claim 1 having a second longitudinally-extending reciprocable slide bar mounted on said one of said plate portions, second spring means for urging said second slide bar to a longitudinal position wherein a portion of said second slide bar engages a second one of said stub shafts, thereby fixing said second one of said stub shafts at a selected position within a second slot in said one of said plate portions, said control means being connected for reciprocating said second slide bar against the force of said second spring means, said first and second spring means being connected to urge said first and second slide bars, respectively, in opposite longitudinal directions.

4. An assembly according to claim 1 in which said portion of said slide bar which engages said stub shaft comprises a truncated conical end of said slide bar.

5. An assembly according to claim 1 in which said rail means includes a longitudinally-extending row of holes spaced along said rail means, a lever mounted on one of said plate portions, further spring means biasing said lever so that a portion of said lever engages a selected one of said holes, and further control means for moving said lever to disengage said portion of said lever from said selected one of said holes.

6. An assembly according to claim 1 having a longitudinally-extending reciprocable second slide bar mounted on the other one of said plate portions, second spring means for urging said second slide bar to a longitudinal position wherein a portion of said second slide bar engages a second one of said stub shafts, thereby fixing said second one of said stub shafts at a selected position within a second slot in said other one of said plate portions, said control means being connected for reciprocating said second slide bar against the force of said second spring means and including a shaft extending between said plate portions of said slide members.

References Cited

UNITED STATES PATENTS

| | | | |
|---|---|---|---|
| 2,134,135 | 10/1938 | Lefevre | 248—419 XR |
| 2,179,085 | 11/1939 | De Rose. | |
| 3,049,329 | 8/1962 | Eddy | 248—419 XR |

FOREIGN PATENTS 528,081  10/1940  Great Britain.

CHANCELLOR E. HARRIS, *Primary Examiner.*

ROBERT P. SEITTER, *Assistant Examiner.*

U.S. Cl. X.R.

248—419, 423